US008200624B2

(12) United States Patent
Clegg et al.

(10) Patent No.: US 8,200,624 B2
(45) Date of Patent: Jun. 12, 2012

(54) MEMBERSHIP TRACKING AND DATA EVICTION IN MOBILE MIDDLEWARE SCENARIOS

(75) Inventors: David Clegg, Altadena, CA (US); Evan Ireland, Wellington (NZ); Harikrishnan Balakrishnan, San Ramon, CA (US); Hemal Pandya, Pune (IN); Johannes Alberti, San Ramon, CA (US)

(73) Assignee: Sybase, Inc., Dublin, CA (US)

( * ) Notice: Subject to any disclaimer, the term of this patent is extended or adjusted under 35 U.S.C. 154(b) by 132 days.

(21) Appl. No.: 12/839,843

(22) Filed: Jul. 20, 2010

(65) Prior Publication Data
US 2012/0023067 A1 Jan. 26, 2012

(51) Int. Cl.
*G06F 17/00* (2006.01)
(52) U.S. Cl. ........ 707/610; 707/611; 707/791; 707/829; 707/956; 707/960
(58) Field of Classification Search ........ 707/609, 707/610, 611, 791, 829, 955, 956, 960
See application file for complete search history.

(56) References Cited

U.S. PATENT DOCUMENTS

| | | | | |
|---|---|---|---|---|
| 6,801,915 | B1 * | 10/2004 | Mack | 1/1 |
| 7,366,460 | B2 * | 4/2008 | O'Farrell et al. | 455/3.06 |
| 7,577,934 | B2 * | 8/2009 | Anonsen et al. | 717/102 |
| 7,730,446 | B2 * | 6/2010 | Anonsen et al. | 717/104 |
| 7,756,829 | B2 * | 7/2010 | Bhanote | 707/634 |
| 7,822,831 | B2 * | 10/2010 | McGowan et al. | 709/220 |
| 7,979,475 | B2 * | 7/2011 | Mack | 707/803 |
| 2002/0188538 | A1 | 12/2002 | Robertson et al. | |
| 2003/0028683 | A1 | 2/2003 | Yorke et al. | |
| 2004/0181771 | A1 * | 9/2004 | Anonsen et al. | 717/100 |
| 2005/0028165 | A1 * | 2/2005 | McGowan et al. | 719/310 |
| 2005/0044165 | A1 * | 2/2005 | O'Farrell et al. | 709/213 |
| 2005/0278277 | A1 | 12/2005 | Forlenza et al. | |
| 2006/0129565 | A1 * | 6/2006 | Tamatsu | 707/100 |
| 2006/0265411 | A1 * | 11/2006 | Anonsen et al. | 707/100 |
| 2007/0136390 | A1 | 6/2007 | Blum et al. | |
| 2009/0254589 | A1 | 10/2009 | Nair et al. | |
| 2010/0174720 | A1 * | 7/2010 | Mack | 707/741 |

OTHER PUBLICATIONS

International Search Report and the Written Opinion of the International Searching Authority directed to related International Patent Application No. PCT/US2011/044250, mailed Feb. 9, 2012, from the Korean Intellectual Property Office; 9 pages.

\* cited by examiner

*Primary Examiner* — Thanh-Ha Dang
(74) *Attorney, Agent, or Firm* — Sterne, Kessler, Goldstein & Fox P.L.L.C.

(57) ABSTRACT

Systems, methods, and computer program products are provided for ensuring coherency between user data in a client and their corresponding state in enterprise information systems (EIS) wherein data migrates and subscriptions change over time. A mobile business object (MBO) identifies an update to a subscription or a change in set membership in order to provide updates to a client device and EIS systems. Cached data is filtered for client device users who synchronize data they are interested in (i.e., subscribed to). In an embodiment, the method keeps track of set membership by remembering on a per remote identifier/business object basis the set membership for a parent business object. When set membership changes, the method sends delete notifications to the device to remove ex-members. The method recognizes common relationship types in a business scenario and handles reference-type relationships as well as containment-type relationships. The methods include key tracking and membership tracking.

15 Claims, 3 Drawing Sheets

MEMBERSHIP TRACKING AND DATA EVICTION IN MOBILE MIDDLEWARE SCENARIOS

BACKGROUND OF INVENTION

1. Field of the Invention

The present invention relates generally to user data synchronization, and, more specifically, to communication methodologies for tracking and synchronizing data changes for users.

2. Description of the Background Art

Remote clients and mobile devices have traditionally relied on synchronizing set membership data with enterprise information systems (EIS systems) whenever connectivity is available by performing a complete synchronization event, usually at a user-specified opportunity. For example, a mobile device may have EIS connectivity when placed in a docking cradle. The mobile device performs a complete synchronization of set membership data, both upload and download, upon docking. For efficiency's sake, traditional mobile middleware servers cache data from a backend EIS to avoid repeated access. With some traditional techniques, the middleware server also facilitates the cache to be modeled for references and relationships of various flavors and allows device users to synchronize the data as coherent business objects while ensuring consistency through modifications that could be effected for the data at each node in the system.

However, these traditional data synchronization methods do not ensure coherency and consistency between occasionally refreshed cached-copies of sets of data users have "subscribed to" on clients and EIS data. This is because in traditional systems, problems arise when cached copies of EIS data on clients such as laptops, desktop computers, HTML5-enabled browser applications, tablet computers, internet TV devices, mobile devices, mobile middleware servers, and the corresponding EIS systems deviate over time as a result of normal business operations. An example of these business operations include membership changes for sets of users. For example, a technical support service call ticket can be reassigned to a different server technician in an EIS, which results in the eviction (i.e., removal) of the previous server technician from a set and the insertion of the newly-assigned server technician into the set. In most cases, something like a work order has a single owner and ambiguity regarding the assigned technician that exists for a long period can be extremely undesirable.

Accordingly, what is desired are improved methods for membership tracking and data eviction to ensure coherency between client user data and enterprise systems.

There are at least two issues that arise from traditional techniques for synchronizing data between mobile clients and enterprise servers. One issue relates to client side data eviction that results in dangling reference data. For example, if a user such as a sales manager chooses to synchronize a different region's data from what he/she currently has on his/her client device, this can result in dangling references such as a product object that was previously synchronized to the device wherein the sales order that referred to the product was subsequently deleted from the device. In another example, sales order items referring to products are synchronized to a mobile with the product data referred to in the sales order. When the sales order is complete and/or deleted from an EIS, the referenced products still linger on the client device. These can be conceptualized as 'dangling reference data.' There are two problems caused by dangling reference data. First, the dangling reference data occupies space on the client device and can eventually cause storage bloat and device malfunction when the client device's data store/database is filled. This can be problematic for some clients such as mobile devices that have limited storage space. Second, the dangling reference data is still referenceable by an application program(s) running on the client device via queries and searches (e.g. via a findAll( ) operation), but is stale in that it refers to data that is no longer relevant. Even if the data is updated, new information will not be downloaded to the client.

Another issue that arises from traditional techniques for synchronizing data between mobile clients and enterprise servers is when there are membership changes. For example, a data instance, such as a mobile business object (MBO) instance, may no longer be a member of a set due to a change of set criteria when a synchronization parameter related to a geographic region is changed (i.e., from Los Angeles to San Francisco). In traditional synchronization systems, if a synchronization parameter is changed, associated data from the client of instances that are no longer members of the new set is not automatically removed or evicted.

Accordingly, what is needed are methods to automatically evict data from the client device of instances that are no longer members of the new set. Another example of business operations that result in the need to evict data from sets are subscription changes. Accordingly, what is further desired are methods with the ability to allow users to manipulate their data "subscriptions" directly so that they will be in charge of what data is to be evicted.

SUMMARY OF INVENTION

Embodiments of the invention include techniques employing mobile middleware to ensure coherency between user data on a plurality of mobile client devices and their corresponding state in enterprise information systems (EISs) in an environment including data migration and subscriptions that change over time. The techniques cache data from the EISs on mobile middleware servers to avoid repeated access. The cached data is filtered for a plurality of device users who need to synchronize their interested data, wherein interest is registered via subscriptions, at varying times. The techniques maintain set membership consistency and data currency needs between the states.

Embodiments of the invention include methods, systems, and computer program products for tracking set membership and evicting (i.e., removing) data from sets. An embodiment of the invention includes a method for synchronizing data updates between a mobile client device and an enterprise information system (EIS). In an embodiment, the method comprises detecting an update to a mobile client device subscription or a change in set membership for a mobile business object (MBO); building a surrogate key list of globally unique surrogate keys that should currently be part of the mobile client device subscription, wherein the list includes child mobile business objects (MBOs) referenced by the MBO that are expected be on the mobile client device upon completion of a synchronization; filtering cached EIS data for a user associated with the mobile client device, wherein the filtering selects a subset of the cached EIS data the mobile client device is subscribed to; in response to detecting an eviction of a member from a set: sending a delete notification to the mobile client device to remove the evicted member; and updating a row in the surrogate key list corresponding to the evicted member to indicate that data associated with the surrogate key is not expected to be on the mobile client device; and in response to detecting a change to or addition of a member in a set: sending an update/insert ('upsert') notification to the mobile client device to update the changed or added member; updating a row in the surrogate key list corresponding to the changed or added member to indicate that the data associated with the surrogate key is expected to be on the mobile client device; and setting a timestamp in the surrogate key list indicating when data associated with the surrogate key first became a part of the subscription data the mobile client device is expected to have.

Embodiments of the invention additionally include a computer-readable medium having computer-executable instructions stored thereon that, if executed by a computing device, cause the computing device to perform a method comprising mapping native attributes for a mobile business object (MBO) to a relational structure; building a list of unique surrogate keys that should currently be part of a client subscription, wherein the list includes child mobile business objects (MBOs) referenced by parent MBOs that are expected be on the client upon completion of a synchronization; determining a set of deleted surrogate keys the client currently has that are no longer in the list of surrogate keys that should currently be part of a client subscription; removing the deleted surrogate keys for the client from a client device database; updating a surrogate key list the client is expected to have; wherein the updating comprises: for surrogate keys the client already has, doing nothing; and for new surrogate keys the client does not yet have: inserting a row in the surrogate key list; and setting a timestamp indicating when this surrogate key first became part of what the client is expected to have.

Embodiments of the invention additionally include a system comprising a memory configured to store modules comprising a mapping module configured to map native attributes for a mobile business object (MBO) to a relational structure; a building module configured to build a list of unique surrogate keys that should currently be part of a client subscription, wherein the list includes child mobile business objects (MBOs) referenced by parent MBOs that are expected be on the client upon completion of a synchronization; a determining module configured to determine a set of deleted surrogate keys the client currently has that are no longer in the list of surrogate keys that should currently be part of a client subscription; an eviction module configured to remove the deleted surrogate keys for the client from a client device database; an upsert module configured to update a surrogate key list the client is expected to have; wherein the upsert module is further configured to: insert, for new surrogate keys the client does not yet have, a row in the surrogate key list; and set a timestamp indicating when this surrogate key first became part of what the client is expected to have.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
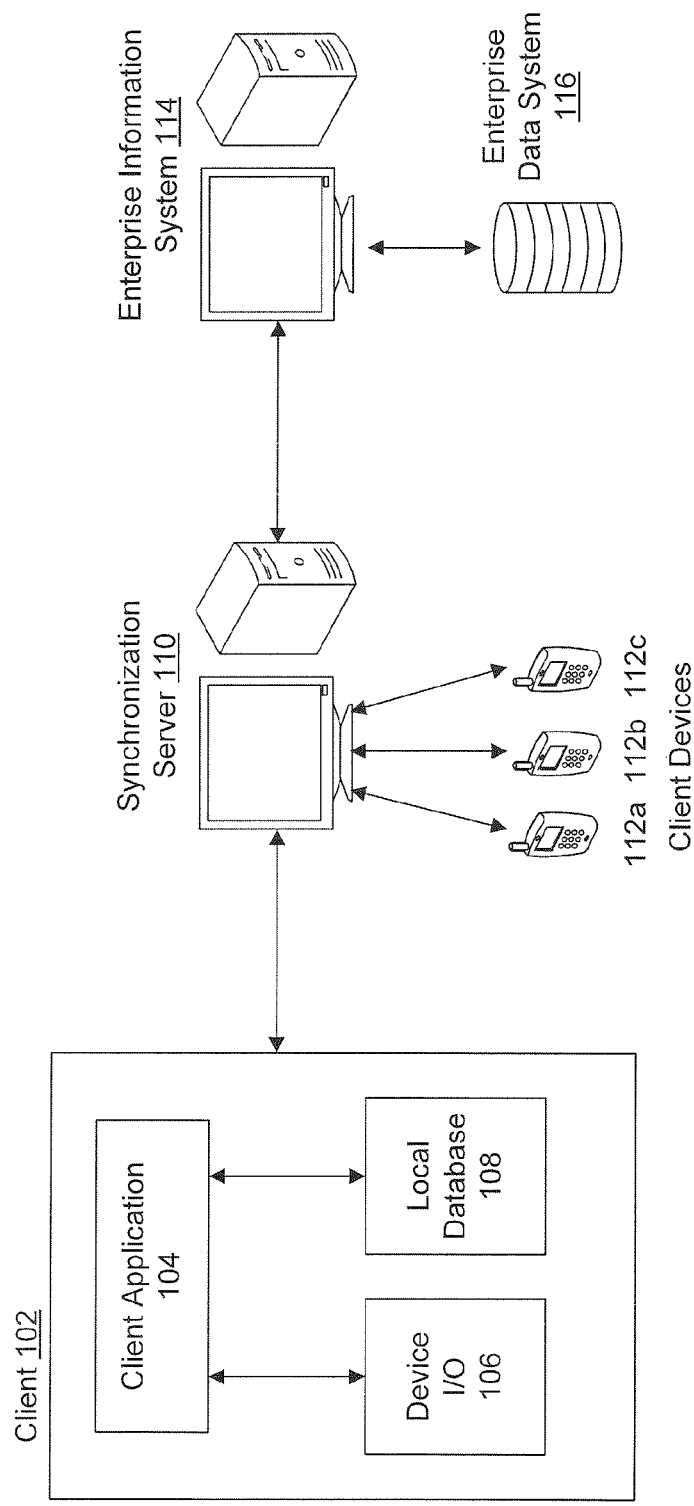
FIG. 1 is an exemplary enterprise network, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the present invention.

Reference to modules in this specification and the claims means any combination of hardware or software components for performing the indicated function. A module need not be a rigidly defined entity, such that several modules may overlap hardware and software components in functionality. For example, a software module may refer to a single line of code within a procedure, the procedure itself being a separate software module. One skilled in the relevant arts will understand that the functionality of modules may be defined in accordance with a number of stylistic or performance-optimizing techniques, for example.

GLOSSARY

The following definitions are offered for purposes of illustration, not limitation, in order to assist with understanding the discussion of various embodiments that follows.

Unless specifically stated differently, in an embodiment, a user is interchangeably used herein to identify a human user, a software agent, or a group of users and/or software agents. Users may be members of user groups (i.e., sets), wherein the sets are related to a specific EIS, a geographic area (i.e., users in a certain country, region, and/or state/province). Besides a human user who is a member of a set, a software application or agent may be a member of a set. Accordingly, unless specifically stated, the term "user" as used herein does not necessarily pertain to a human being. A user may be represented by a user ID or account in an EIS. A user may also be represented by a client application. Users can have login credentials associated with them. Login credentials can include, but are not limited to, a user name and a password.

For example, a user may be a member of a set and can have an application user name and password. A user may also have a separate user name and password.

As used herein, in an embodiment, the terms "client" and "mobile device" refer to a remote client. A client or mobile device may be one or more of a user's laptop, tablet computer, PDA, Smartphone, or personal computer, as further described below with reference to clients 102 and 112*a-c* depicted in FIG. 1. According to embodiments, a client may also be a desktop computer, an HTML5-enabled browser application, or an internet TV device.

As used herein, in an embodiment, the terms "remote database" and "client database" refer to a database or persistent data store on a client or mobile device used to store data used by the client or mobile device. In an embodiment, occasionally synchronized cached EIS data is stored in a remote database on a client or mobile device.

As used herein, in an embodiment, the term "upsert" refers to a database insert or update or operation that is written to attempt an insert operation, and if the insert fails due to a primary key or other unique key constraint, conditionally resubmit the insert as an update operation. In this way, a single upsert operation can successfully commit to a database even in cases where the data cannot be inserted as a new row in a database table without needing to rollback a failed insert transaction.

As used herein, Mobile Business Objects (MBOs) are a unit of exchange. In an embodiment, an MBO is a fundamental unit of data exchange in the SYBASE™ Unwired Platform (SUP). An MBO corresponds to a data set from a back-end data source, such as an EIS server. The data can come from a database query, a Web service operation, an enterprise application, or a file. A non-limiting example of MBOs is provided in U.S. patent application Ser. No. 12/503,573, filed on Jul. 15, 2009, and entitled "Metadata Driven Mobile Business Objects," which is incorporated by reference herein in its entirety.

An MBO contains both concrete implementation-level details and abstract interface-level details. At the implementation-level, an MBO contains read-only columns that contain metadata about the data in the implementation, and parameters that are passed to the back-end data source. At the interface-level, an MBO contains attributes that map to columns, which correspond to client properties. An MBO may have operations, which can also contain parameters and arguments, and which may be used to create, update, or delete data. An MBO is a business object that can be synchronized between enterprise information system, such as EIS 114 described below with reference to FIG. 1 and a client, such as clients 102 and 112-*a-c* described below with reference to FIG. 1. The MBO can be persisted, by storage in local database 108, in order to allow for access by the client 102 during periods without connectivity to EIS 114.

Membership Tracking and Data Eviction System

FIG. 1 is an exemplary membership tracking and data eviction system 100, in accordance with an embodiment of the present invention. According to an embodiment of the invention, system 100 operates within an enterprise network and includes clients 102 and 112*a-c*. In accordance with further embodiments of the present invention, client 102 may be one of many devices commonly designated as mobile computing platforms or personal digital assistants (PDAs), such as but not limited to, laptops, tablet computers, devices operating according to the Microsoft Pocket PC specification with the Microsoft Windows® CE operating system (OS), devices running the Symbian OS, devices running the Palm® OS, APPLE iPhones® by APPLE COMPUTER, INC. of Cupertino, Calif., mobile phones, BlackBerry® devices by RESEARCH IN MOTION of Waterloo, Ontario, Canada, smart phones, hand held computers, palmtop computers, laptop computers, ultra-mobile PCs, and other wireless mobile devices capable of running client application 104. Clients 112*a-c* may further encompass other wireless mobile computational devices or other data processing devices with any similar resource limitations as PDAs.

One skilled in the relevant arts will recognize that techniques described herein as applicable to client 102 may also generally be applied to non-mobile devices as well, such as, for example, a personal computer.

In accordance with an embodiment of the present invention, client 102 has a client application 104 installed thereon. According to an embodiment of the present invention, client application 104 is able to interface with device inputs and outputs ("I/O") 106, such as, for example, a monitor, keypad, trackball, stylus, or touch screen display. Client application 104 is also able to interface with a local database 108, which stores a set of data intended for use by client application 104. Local database 108 comprises data corresponding to the set membership of the user using client 102 and client application 104.

Client 102 is in communication with synchronization server 110, in accordance with an embodiment of the present invention. Additional clients 112*a-c* are similarly in communication with synchronization server 110, in accordance with a further embodiment of the present invention. The various clients can be connected to synchronization server 110 via any one or more communications channels, as would be understood by one skilled in the relevant art. For example, connectivity between client 102 and synchronization server 110 may involve, in an exemplary embodiment, communication hops over both a cellular communication network and the Internet. The various communication hops may themselves be either public or private networks, and may include components located on the Internet as well as various private intranets.

Synchronization server 110 sits between the one or more clients 102 and 112*a-c* and an Enterprise Information System (EIS) 114, in accordance with an embodiment of the present invention. Synchronization server 110 assists in capturing changes to relevant data made by the EIS 114 and providing the changes to clients 102 and 112*a-c*.

Synchronization server 110 also assists in capturing changes made by the clients 102 and 112*a-c* and providing the changes to EIS 114. In this manner, data available to a client 102 in local database 108 can be synchronized with data from the corresponding data store of EIS 114, the enterprise data system 116. In accordance with an embodiment of the present invention, synchronization server 110 maintains a cache reflecting the data from enterprise data system 116. In an embodiment, synchronization server 110 maintains the cache in a cache database (not shown) with a copy of selected data from enterprise data system 116, corresponding to MBO classes used by client application 104 on client 102.

EIS 114 is connected to synchronization server 110 in order to allow synchronization server 110 to provide the aforementioned data synchronization services, in accordance with an embodiment of the present invention. Communications between EIS 114 and synchronization server 110 can likewise be through any communication channels, as would be understood by one skilled in the relevant art. One skilled in the relevant arts will further understand that EIS 114 and synchronization server 110 may share a same physical server or distributed server as separate software components therein, or may even be compiled as a single combined application.

Therefore, it is understood that synchronization server 110 and EIS 114 may be disposed in a number of different locations within enterprise network 100, and are shown as separate computing devices in FIG. 1 by way of example, and not limitation.

In an embodiment of the invention, a type of an EIS 114 operation parameter can range from simple (i.e., primitive) to complex (i.e., involving structures and/or lists). For example, an EIS 114 operation to create a new customer is a web service that expects to receive an extensible markup language (XML) element with a nested structure. When a new customer is created, the set membership for the corresponding set(s) of customers changes accordingly. A newly-created customer may be a member of a plurality of sets, based upon the customer's attributes. A non-limiting example of such a web service is represented by the following XML code. In the example below, the newly created customer may be a member of a set of 'US customers,' 'California customers,' and 'San Jose customers.' As would be appreciated by one of skill in the relevant arts, other programming languages and technologies can be used to create a new EIS set member in the programming language code sample below.

```
<createCustomer>
   <authInfo>
      <username>albert</username>
      <password>secret</password>
   </authInfo>
   <custInfo>
      <name>Griffins</name>
      <phone>(555)123-4567</phone>
      <address>
         <street>123 Fourth Street</street>
         <city>San Jose</city>
         <state>CA</state>
      </address>
   </custInfo>
</createCustomer>
```

As previously noted, EIS 114 further includes, or is otherwise communicatively coupled to, an enterprise data system 116, in accordance with an embodiment of the present invention. In accordance with a further embodiment of the invention, data within local database 108 comprises a subset of data from enterprise data system 116. This subset is based in part on the set membership and subscription(s) of the user associated with client 102. This subset data may be in the form of a mobile business object ("MBO"), in accordance with an embodiment of the present invention. Example methods for changing a data row of a table in local database 108 on client 102 and submitting the change for synchronization with EIS 114 via synchronization server 110 are described in U.S. patent application Ser. No. 12/797,975, filed on Jun. 10, 2010 and entitled "Pending State Management for Mobile Business Objects", which is incorporated herein by reference in its entirety.

In accordance with an embodiment of the present invention, MBOs can be defined in packages wherein the package contains definitions of one or more MBOs. An MBO can be defined, through use of a visual modeling tool, as a set of attributes that are akin to structure fields and a set of operations used by a remote client. Example visual modeling methods and tools to bind synchronization parameter values for MBOs are described in U.S. patent application Ser. No. 12/840,239, filed on Jul. 20, 2010 and entitled "Parameter Value Binding For Mobile Business Objects," which is incorporated herein by reference in its entirety.

A non-limiting example MBO is represented by the following XML code. As would be appreciated by one of skill in the relevant arts, other programming languages and technologies can be used to define an MBO and create a new set member in the programming language code samples below.

```
<package name="my.package">
   <database-class name="MyDatabase" />
   <entity name="Customer" key="id">
      <attribute name="id" type="string" />
      <attribute name="name" type="string" />
      <attribute name="phone" type="string" />
      <attribute name="address" type="string" />
      <attribute name="city" type="string" />
      <attribute name="state" type="string" />
      <operation name="create">
         ...
      </operation>
      <operation name="update">
         ...
      </operation>
      <operation name="delete">
         ...
      </operation>
   </entity>
</package>
```

Based on the above exemplary definition, MBO classes (i.e., source code) will be generated by an MBO code generator. These classes can be used by the client application developer. For example, the developer might write code such as the following to create a new customer that will be a member of a set of customers.

```
Customer c = new Customer( );
c.setName("Griffins");
c.setPhone("(555)123-4567");
c.setAddress("123 Four St");
c.setCity("Dublin");
c.setState("CA");
c.create( );
```

An exemplary call to upload the above new customer operation to an EIS is provided below:

```
c.submitPending( );
MyDatabase.synchronize( );
```

Communications between client application 104 and synchronization server 110 may be handled in a number of different ways, as will be recognized by one skilled in the relevant arts. In accordance with an embodiment of the present invention, a communications framework is embedded directly within client application 104 as provided by a code generator or by a developer. According to an additional embodiment of the invention, a helper application may be deployed to client 102 to manage communications with EIS 114 via synchronization server 110.

Mobile Business Object and Member Entity Models

In accordance with an embodiment of the present invention, MBOs can be modeled using a publicly available XML-based domain-specific language called Applications From XML ("AFX"). One skilled in the relevant arts will recognize that MBOs can be modeled in many different ways, including graphically through the use of visual modeling tools, or textually through the use of domain-specific languages such as AFX. Accordingly, examples presented and discussed herein through the use of AFX are provided by way of example, and not limitation.

A package definition provides a database definition, defining the name of a local database 108 within client 102, a database-class definition, and zero or more entity definitions, in accordance with an embodiment of the present invention. The database-class definition identifies a class that represents the local database 108. Entity definitions, if defined, each correspond to an MBO. The entity definition in turn defines the name of a class that represents the corresponding MBO.

Entities are themselves stored within local database 108, in accordance with an embodiment of the present invention. In accordance with a further embodiment of the present invention, entities are keyed using at least a surrogate key and an alternate key. The surrogate key is a key value used by the client 102 to account for the client's inability to access the EIS' 114 key creation process. A surrogate key is not used by a backend enterprise data system 116. If a remote client becomes aware of the EIS 114 key for the entity, this key can be used as an alternate key. In accordance with a further embodiment of the present invention, surrogate keys are provided by synchronization server 110 to client 102 as a batch of keys to be assigned as needed.

In accordance with a further embodiment of the present invention, entity definitions include operation definitions for corresponding changes within EIS 114. By way of example and not limitation, operation definitions are provided for creating, updating, or deleting (i.e., evicting) set membership data within client 102 and EIS 114. Entity definitions may also provide named queries, which are predefined queries that can be issued by client 102 against local database 108, in accordance with an embodiment of the present invention. In accordance with further embodiments of the present invention, entity definitions may also include definitions indicating that set membership and subscription changes made by client 102 can be published to synchronization server 110, and likewise that set membership and subscription changes made by EIS 114 are subscribed to by users or client applications 104 for download to clients 102 and 112*a-c*.

A non-limiting example object model incorporating the aforementioned elements may therefore read:

```
<package name="com.example.bank">
    <database name="my-bank" />
    <database-class name="MyDatabase" />
    <entity name="Account" key="surrogateKey" alternate-key="accountId">
        <attribute name="surrogateKey" type="int" generated="true" />
        <attribute name="accountId" type="string" />
        <attribute name="customerId" type="string" />
        <attribute name="balance" type="decimal" />
        <operation name="create">
            <!-- information describing the EIS operation -->
        </operation>
        <operation name="update">
            <!-- information describing the EIS operation -->
        </operation>
        <operation name="delete">
            <!-- information describing the EIS operation -->
        </operation>
        <query name="findByCustomer" type="Account*">
            <parameter name="id" type="string" />
            <sql>
                select a.* from Account a where a.customerId = :id
            </sql>
```

```
        </query>
        <publish />
        <subscribe />
    </entity>
</package>
```

In the above exemplary object model, a package "com.example.bank" associated with local database 108 "my-bank" represented by class "MyDatabase" contains a single entity named "Account". This entity is keyed by a surrogate key, with an alternate key defined by the account ID, which in this instance is the actual unique key used by the backend systems of EIS 114.

The Account entity also has several attributes, including the aforementioned surrogate key and account ID, but also a customer ID corresponding to the account and the balance of the account, in accordance with an embodiment of the present invention. The Account entity also defines a query "findByCustomer" that allows for a particular Account with the corresponding customer ID (i.e., set member) to be located and used in an instance of the MBO.

Additionally, the Account entity defines several operations describing EIS 114 operations for creating, updating, and deleting data corresponding to an entity from within enterprise data system 116, in accordance with an embodiment of the present invention.

In accordance with an embodiment of the present invention, a code generator is run on the package definition in order to generate code for inclusion in client application 104. This allows a developer of client application 104 to rapidly enable the client application 104 to coordinate the downloading and uploading of set membership and subscription changes between client 102 and synchronization server 110. In accordance with a further embodiment of the present invention the code generator can also generate code for execution on the synchronization server 110.

In the above examples, each account represents an instance of an MBO and each customer is a member of a set. As previously noted, and as shown in the exemplary object model, MBOs may support functions that enable the specification of changes to EIS 114, in accordance with an embodiment of the present invention. These changes are, in an exemplary embodiment, create, update, or delete operations performed on an MBO. These operations can be create, update, and delete operations for customers, users or other set members.

If a new set member, such as a new account is created, an account.create( ) method can be called to commit the account to local database 108. The account.delete( ) method would delete the account from local database 108. These modifications are all stored within local database 108 as pending changes, in accordance with an embodiment of the present invention. In accordance with a further embodiment of the present invention, local database 108 retains a copy of the original state prior to modification. This allows reversion of the local database 108, if desired, in the event that a replay of the data by EIS 114 against enterprise data system 116 fails for any reason.

When client application 104 is ready to submit the pending change to synchronization server 110 for synchronization to EIS 114, the submitPending( ) method is called (e.g., account.submitPending( )) in order to queue the pending change for delivery, in accordance with an embodiment of the present invention. In accordance with a further embodiment of the present invention, the pending change is delivered in a message, as will be described in detail below.

In accordance with a further embodiment of the present invention, a message sent to synchronization server 110 containing the pending change also includes the original state. By submitting the pending state and original state, the EIS 114 is able to avoid, detect, or resolve many conflicts.

In the event that the EIS 114 is unable to resolve a conflict, or if EIS 114 wants to allow the client 102 to resolve the conflict, EIS 114 can provide client application 104 with a notification of the failure, in accordance with an embodiment of the present invention. In accordance with a further embodiment of the present invention, EIS 114 can also provide client application 104 with a notification of a successful replay operation.

A non-limiting example is provided below for defining a customer entity (i.e., a set member) from an exemplary "customer" table in a database.

```
<entity name="Customer" key="surrogateKey" alternate-key="id">
  <attribute name="id" type="int" />
  ...
  <attribute name="state" type="string" max-length="2" />
  <attribute name="surrogateKey" type="long" generated="true" />
  <attribute name="orders" type="Order*" cascade="all"
    inverse="Order.customer" />
  <publish with-replay="true" />
  <subscribe>
    <download-data>
      <synchronization-parameter name="state" type="string" />
      <sql>SELECT x.* FROM Customer x WHERE x.state = :state</sql>
    </download-data>
  </subscribe>
  ...
</entity>
```

In the above example, a 'state' synchronization parameter is set. Internally within system 100, this parameter is transformed into a 'customer_pq' entity (persistent query), in accordance with an embodiment of the invention. In an embodiment, setting the 'state' synchronization parameter results in creation of a subscription row in the 'customer_pq' table.

Definition of some related entities is provided below. A non-limiting example for defining a customer entity (i.e., a set member) from an exemplary "customer" table in a database may therefore read:

```
<entity name="Order" key="surrogateKey" alternate-key="id">
  <attribute name="id" type="int" />
  ...
  <attribute name="surrogateKey" type="long" generated="true" />
  <attribute name="customer" type="Customer"
    foreign-key="customerKey" />
  <publish with-replay="true" />
  <subscribe inherit-from="customer" />
  ...
</entity>
<entity name="OrderLine" key="surrogateKey" alternate-key="id">
  <attribute name="id" type="int" />
  ...
  <attribute name="surrogateKey" type="long" generated="true" />
  <attribute name="order" type="Order" foreign-key="orderKey" />
  <attribute name="product" type="Product" foreign-key="productKey" />
  <publish with-replay="true" />
  <subscribe inherit-from="order.customer" />
  ...
</entity>
```

```
<entity name="Product" key="surrogateKey" alternate-key="id">
  <attribute name="id" type="int" />
  ...
  <attribute name="surrogateKey" type="long" generated="true" />
  <publish with-replay="true" />
  <subscribe /> <!-- note: not inherited -->
  ...
</entity>
```

In an embodiment, for any customer that is downloaded to client 102, that customer's orders and order lines are also downloaded. Related products can be independently downloaded.

According to an embodiment, a download cursor, which runs at synchronization server 110, can be automatically derived (by an AFX compiler) from the "sql" element inside the "download-data" element shown in the non-limiting example below. The code example below provides a download cursor, which is slightly modified for simplicity, in accordance with an embodiment of the invention.

```
select distinct x.id, x.fname, x.lname, x.address, x.city, x.state, x.zip,
  x.phone, x.company_name, x.surrogateKey, x.lastModified, x.deleted
  from customer_pq pq, customer x
  where pq.remoteId = ?
    and pq.deleted = 0
    and x.state = pq.stateParam
    and x.lastModified >= ? or pq.lastModified >= ?
```

A traditional data eviction scheme for persistent queries (at 22 Mar. 2010) was based on a lastAccessed time (stored in the customer table and also in the customer_pq table). This traditional technique operated as follows:

when a customer_pq row is accessed in the client database, its lastAccessed time is updated when a customer row is accessed in the client database, its lastAccessed time is updated the Customer class gets a method:

public static void evict(int n) { . . . }

The "evict" method above will delete any customer_pq and customer rows that have not been accessed on the client for more than 'n' number of days. For example, the traditional technique, using method call "evict(7)," will delete data that has not been accessed in 7 days. Shortcomings associated with this traditional scheme include:

1. Managing a lastAccessed time in the customer or customer_pq table, with clients, such as MobiLink clients, can cause download conflicts. This is because traditional synchronization systems are not supposed to modify downloaded rows, since they upload changes by performing a 'replay' of an operation. This results in the need to maintain separate tables with lastAccessed times, which by extension results in more code generation and can require more, join queries.

2. When "persistent queries" are used to implement synchronization parameters, no eviction methods are generated. In other words, the traditional eviction scheme is available only when using on-demand subscriptions, which may not be supported in all mobile synchronization environments.

3. Relying on an inactivity timeout is not very precise for membership tracking and data eviction.

4. The scheme does not handle "object migration". For example, if a customer "Jim" with state="NY" exists and client 102 has a subscription to New York customers (i.e., customers with state="NY"), the customer "Jim" is downloaded to client 102 and stored in local database 108. In a scenario where the customer then migrates to state="CA," the customer database in enterprise data system 116 is updated. When client 102 next synchronizes, it will not download "Jim" again. The issue in this scenario is that local database 108 still has the "Jim" record, but the record has the old state of "NY." In an embodiment of the invention described below with reference to FIG. 2, the "Jim" record is automatically evicted from client 102 through use of membership tracking techniques that employ surrogate keys.

5. The scheme also does not download deletions (i.e., evictions) to the client that should be downloaded due to a "pq" row being deleted by the client. Because of issue (2) above, "pq" rows are currently being deleted by the client.

Two methods are described below with reference to FIG. 2 to resolve issue 4 with regards to the traditional scheme. In accordance with an embodiment, the first method involves tracking surrogate keys (of parent objects) that have been downloaded to client 102. According to this embodiment, if a download cursor does not find surrogate keys again during a second or subsequent run, the technique sends a download-delete to client 102.

In another embodiment, a second method tracks membership changes so that whenever a "subscribed attribute" (i.e., an attribute used in a where clause of a download cursor) is changed, a "membership tracking" row is created in a separate table that can be referenced in the download cursor to determine rows that should be deleted from client 102.

In order to resolve issue 5 above with regards to data eviction, in an embodiment, if a "pq" row has been deleted by the client, the technique causes a download-delete for any customer that is referenced by the deleted "pq". In an embodiment, the condition "pq.deleted=0" is removed from the download cursor. This removal from the download cursor may therefore read:

```
select distinct x.id, x.fname, x.lname, x.address, x.city, x.state, x.zip,
x.phone, x.company_name, x.surrogateKey, x.lastModified,
x.deleted, pq.deleted from customer_pq pq, customer x
where pq.remoteId = ?
 -- removed condition: and pq.deleted = 0
 and x.state = pq.stateParam
 and x.lastModified >= ? or pq.lastModified >= ?
```

In an embodiment, if surrogate key tracking is employed to handle object migration, then the above cursor change may not be needed as download cursor handling may have its own way of handling deletions.

This technique can result in the same customer row appearing twice in the result set, once with pq.deleted=0 and once with pq.deleted=1. This is due to the possible occurrence of multiple "pq" rows, one or more of which is marked as deleted, and one or more of which is not marked as deleted. In this case, generated code will eliminate the row where pq.deleted=1, in accordance with an embodiment of the invention. The deleted flag may be used to determine 'upsert' (i.e., update/insert) operations vs. delete operations. In an embodiment, delete operations are then calculated as (x.deleted or pq.deleted). If all pq rows for the selected client have pq.deleted=1, or the customer is deleted, then a download-delete is sent to the client, in accordance with an embodiment of the invention.

According to an embodiment, the technique arranges persistent query subscription rows (i.e., customer_pq rows) associated with old, non-current, values of synchronization parameters that will be automatically deleted by the client at the start of a synchronization. A user wanting multiple subscriptions can use a list-typed synchronization parameter, in accordance with an embodiment of the invention.

In message-based synchronization systems, a user might not explicitly invoke a synchronization. In an embodiment, a synchronization is initiated implicitly in some cases. For example, if the user saves an object associated with one or more synchronization parameters, or saves changes to personalization parameters for an object where any personalization parameter is specified as the default-key for any synchronization parameter, then a synchronization is automatically initiated through an implicit function call (i.e., a call to a "synchronize" function, procedure, or method).

Subscription Management Technique

An explicit subscription management method is described below, in accordance with an embodiment of the present invention.

In scenarios where a developer uses a multi-valued (list-typed) synchronization parameter, it may not be convenient for them to manage subscription rows such as instances of an implicitly generated Customer_pull_pq entity. For example, a user cannot run queries against their subscriptions (especially when there are many, such as when a client 102 associated with the user is subscribed to many products having a synchronization parameter on an 'id' attribute).

In accordance with an embodiment of the invention, the solution to this problem is to make subscription entities public, and give them more descriptive names. For example a subscription may be named "CustomerSubscription" instead of "Customer_pull_pq." According to an embodiment, instead of using a list-typed synchronization parameter, developers can use a simple-typed synchronization parameter, and manage multiple subscription instances themselves.

According to this exemplary embodiment, the CustomerSubscription entity should have a "state" attribute rather than "stateParam" used in Customer_pullpq, so that the "Param" suffix is dropped. In an embodiment, internal persistent query (PQ) attributes (such as, but not limited to "remoteId") are not accessible to client application 104. For example, these internal PQ attributes may be Java package-private or C# internal variables. In an embodiment, the "id" PQ attribute can be renamed to avoid a name clash in the event a user has a synchronization parameter named "id."

Membership Tracking and Data Eviction Methods

Figure 2:
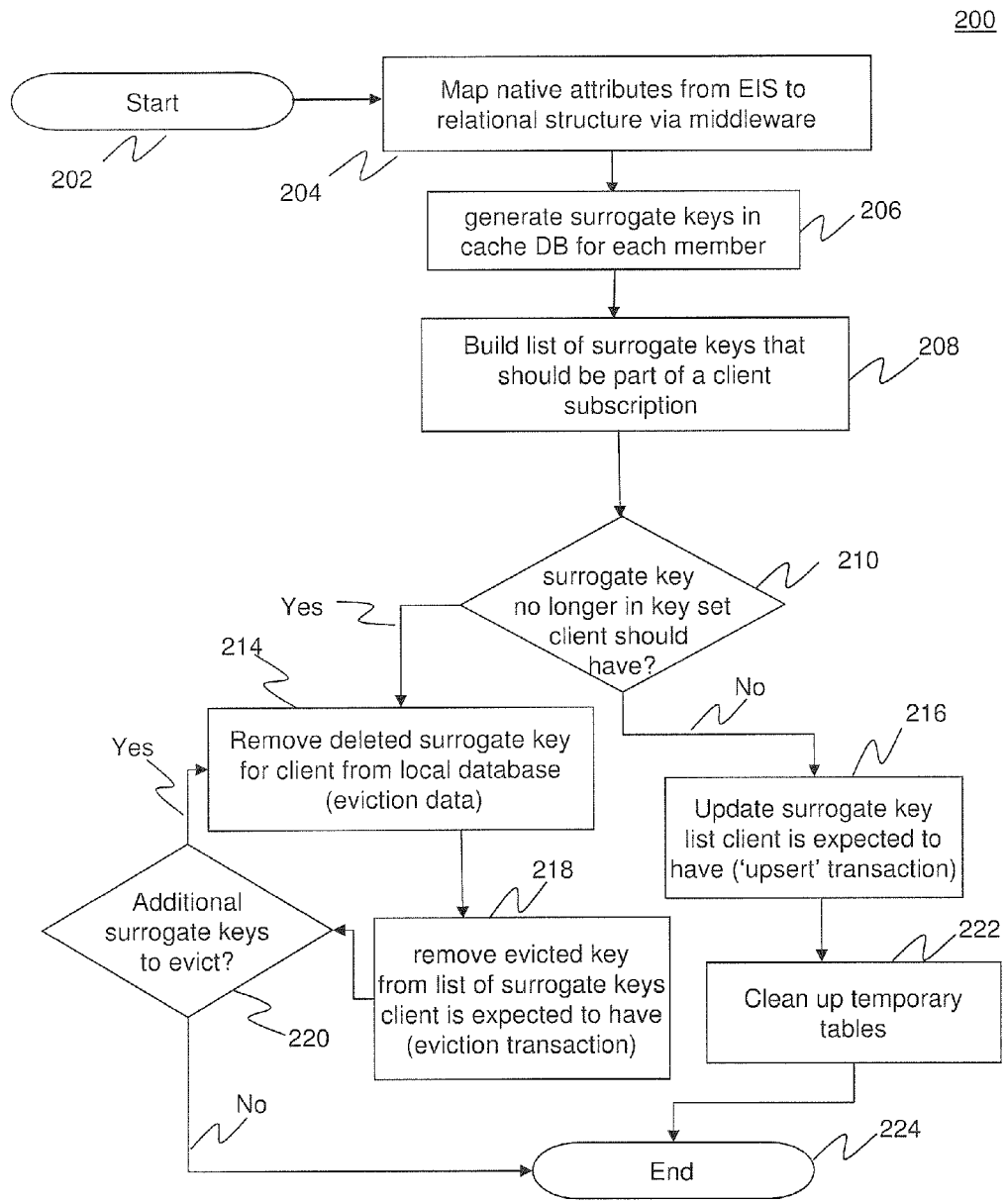
FIG. 2 is a flowchart illustrating steps by which set membership is tracked and synchronized between a client and an enterprise information system (EIS), in accordance with an embodiment of the present invention.

FIG. 2 is a flowchart 200 illustrating steps by which membership tracking and data eviction are performed, in accordance with an embodiment of the present invention.

More particularly, flowchart 200 illustrates the steps by which a client application 104 of client 102 is operable to track set membership and evict data based upon synchronizing a business object with EIS 114 via synchronization server 110, in accordance with an embodiment of the present invention.

FIG. 2 is described with continued reference to the embodiment illustrated in FIG. 1. However, FIG. 2 is not limited to that embodiment. Note that the steps in the flowchart do not necessarily have to occur in the order shown.

In an embodiment, the method minimizes the number of round-trip operations to a cache database on synchronization server 110 and the amount of result data sent back and forth to client 102 to/from synchronization server 110. According to an embodiment, the method incorporates the queries needed for membership tracking and data eviction into a generated stored procedure and ensures that all the client synchronization processing occurs in a single remote procedure call (RPC) to the cache while passing in simply the client id and last synchronized time as parameters. In an embodiment, the RPC returns two result sets which are the delete and upsert streams. According to this exemplary embodiment, client tracking tables are correctly maintained as a side-effect and there is no need to transfer potentially large sets of surrogate keys to a middleware server for any processing.

A method used for membership tracking and data eviction during synchronization of a client 102 is described below with reference to steps 202-224 of flowchart 200. For each MBO in a subscription, starting with parent business object, the steps 204-222 described below are performed.

The method begins at step 202 and proceeds to step 204 where a mapping of native attributes from EIS 114 via middleware takes place.

In step 204, when EIS 114 sends data to synchronization server 110 or synchronization server 110 obtains data from EIS 114, native attributes from enterprise data system 116 are mapped to a relational structure by middleware. In an embodiment, the native attributes are mapped to a relational database table in a SYBASE™ Unwired Platform (SUP). In this step, EIS data is mapped into a relational structure of rows and columns wherein each row represents one MBO attribute, and wherein the MBO attributes are native attributes from the EIS. For example, a set member such as a customer in enterprise data system 116 may have attributes such as, but not limited to fields such as a customer ID, name, password, address. In this example, there will be a row of data for each customer in enterprise data system 116 and a primary key is identified in step 204 which uniquely identifies each customer. In an embodiment, the identified primary keys are used to optimize subsequent caching operations during synchronization between client 102 and EIS 114. The primary keys can indicate whether a record change is an update/insert ('upsert') or a delete. For example, primary keys can be used to optimize creation and updating of copies of member records in a cache database on synchronization server 110 by indicating whether a given member (with a primary key such as a member ID) already exists or is newly created.

After the native EIS attributes are mapped, the method proceeds to step 206.

At step 206, surrogate keys are generated, in accordance with an embodiment of the present invention. In an embodiment, surrogate keys are globally unique identifiers used on synchronization server 110 and are not used within EIS 114. In this step, surrogate keys are generated and populated in a cache database on synchronization server 110, in accordance with an embodiment of the invention. In an embodiment, the surrogate key set is put into a temporary table on synchronization server 110. In this step, a surrogate key is generated for each set member, such as a customer. After the surrogate keys are generated, the method proceeds to step 208.

At step 208, a list of surrogate keys that should currently be part of a subscription for client application 104 are built, in accordance with an embodiment of the present invention. In this step, a determination of all surrogate keys generated in step 206 that correspond to data a client is interested is made. In an embodiment, a client's interest in set members is expressed as one or more subscriptions. In step 208, surrogate key lists that a client previously had a result of a prior synchronization are compared to surrogate keys associated with data that the client is interested in. In an embodiment, each time a remote client synchronizes, synchronization server 110 maintains, for that client, a list of surrogate keys for data that the had as a result of the synchronization. In this way, a record of surrogate keys data previously-synchronized to client 102 is maintained on synchronization server 110. In accordance with a further embodiment of the present invention, it is determined that a client should have a business object based on two criteria:

a). The client has an explicit "pull query" subscription on that business object b). This business object is the child of a relationship of other business object the client has a subscription for.

An example query to gather results for criteria a) above in this step may read:

```
SELECT x.surrogateKey FROM <MBO>_pq pq, <MBO> x
WHERE pq.remoteId = ?
AND pq.deleted = 0
AND x."<attribute>" = pq."<attribute>" (repeated for each pq attribute)
AND x.pending= 'N'
Where ? is the complete list of surrogate keys for the MBO that will go to the client pursuant to the client's pull subscriptions.
```

In an embodiment, step 208 does not consider last modified timestamps.

An example query to gather results for criteria b) above in this step may read:

```
SELECT x.surrogateKey FROM
<MBO> x, <Parent_MBO>_SK psk
WHERE
psk.clientid = ?
AND x.parentSurrogatekey = psk.sk
AND x.pending= 'N'
AND x.deleted= 0
```

The above query will return all of the child MBOs referenced by parent MBOs that should be on the client upon completion of a synchronization. In an embodiment, the results of the two queries above are used to populate temporary tables.

In an embodiment, step 208 includes determining a distinct union of the results of the two above queries to build the full set of surrogate keys the client should have when the synchronization is done. As would be understood by one skilled in the relevant art the distinct union excludes duplicate surrogate keys returned by the two queries.

According to an embodiment, step 208 includes putting the full set of surrogate keys into a temporary table. An example create statement to populate the temporary table may read:

```
CREATE GLOBAL TEMPORARY TABLE #should_have_SK (sk bigint PRIMARY KEY) NOT TRANSACTIONAL
```

Step 208 can be conceptualized as a set difference operation between the surrogate keys for set members, such as customers, that a client currently has that are not in the set of surrogate keys the client should have after the synchronization is complete. In the embodiment shown above, this set difference is stored in a temporary table storing list of surrogate keys. After the list of surrogate keys is built, the method proceeds to step 210.

In step 210, a determination is made as to whether any of the surrogate keys the client currently has are no longer in the set of surrogate keys the client should have (i.e., the set of surrogate keys built in step 208), in accordance with an embodiment of the invention. Step 210 can be performed as a difference operation to determine all surrogate keys that the client currently has that should be evicted because they are no longer in the set of keys the client should have. The result of performing this step will be a list of surrogate keys for members that should be evicted from local database 108 on client 102. Step 210 represents this determination as a decision as to whether a given surrogate key is no longer in the set of surrogate keys the client should have. According to an embodiment, this determination is repeatedly performed for each surrogate key the client currently has. In an embodiment, this determination may be made with the following query:

```
SELECT sk.sk FROM
<MBO>_client_SK sk
WHERE sk.clientid = ?
AND sk.sk NOT IN (SELECT ssk.sk FROM
#should_have_SK ssk)
```

In an embodiment, the result set for the above query is the download delete cursor for the client.

If it is determined that a surrogate key is no longer in a set the client should have, then control is passed to step 214, where the data is evicted (deleted). On the other hand, if it is determined in step 210 that a surrogate key is in the set the client should have, then control is passed to step 216.

In step 214, data corresponding to the deleted surrogate keys for the client is removed from local database 108 on client 102, in accordance with an embodiment of the present invention. In an embodiment, this step ensures that this removal is part of a transaction, so that the removal can be rolled back in response to determining that the synchronization fail has failed. This step involves removing from local database 108 table records corresponding to surrogate keys that should be evicted. This removal may be represented as the following delete statement:

```
DELETE FROM <MBO>_client_SK
WHERE sk IN (SELECT sk FROM #should_delete_SK)
```

At step 218, the evicted surrogate keys are removed from a list of surrogate keys the client is expected to have (i.e., the surrogate keys the client should currently have), in accordance with an embodiment of the invention. In an embodiment, this step is performed by deleting a surrogate key from a 'permanent record' table listing all surrogate keys the client should have. After the evicted surrogate keys are removed, the method proceeds to step 220.

In step 220, a determination is made as to whether there are additional surrogate keys to evict. If it is determined that there are additional keys to evict, control is passed to step 214. In this way, steps 214 and 218 are repeated for each surrogate key that should no longer be in the set of surrogate keys. If it is determined that there are no further surrogate keys to evict, control is passed to step 224.

At step 216, the surrogate key list that a client is expected to have is updated, in accordance with an embodiment of the invention. In an embodiment, this step is performed via use of an upsert transaction that can be rolled back in response to determining that synchronization has failed. This update to the surrogate key list may be represented as the following insert statement:

```
INSERT INTO <MBO>_client_SK(clientid, sk) ON EXISTING SKIP
select ?, sk FROM #should_have_SK
```

Where ? is the current client's ID and is passed in as a parameter to the above select query.

In an embodiment, for surrogate keys the client already has, the above insert statement does nothing (due to the 'on existing skip' clause), but for each new surrogate key, the client does not yet have the above statement both inserts a row and by virtue of the default setting for first_added column sets a timestamp when this surrogate key first became part of what the client should have.

According to an embodiment, step 216 comprises generating an upsert cursor to send inserts of new MBOs and updates of changed MBOs to the client. This upsert cursor may be represented as the following query:

```
SELECT x.* FROM <MBO> x, <MBO>_client_SK sk
WHERE
sk.clientid = ?
AND x.surrogateKey = sk.sk
AND (x.last_modified > ? OR sk.first_added > ?)
Where the input parameters ? are the clientid, and the
last_sync_time for that client (twice).
```

The final AND clause in the select statement above picks up MBO changes (last_modified >) and MBOs that are new to the client (because of a membership change, a pull query change, or a parent relationship change). After the surrogate key list is updated, control is passed to step 222 where temporary tables are cleaned up.

In step 222, temporary tables listing surrogate keys the client should have and surrogate keys that should be deleted are cleaned up, in accordance with an embodiment of the invention. This clean up may be represented as the following delete statements:

```
delete from #should_have_SK
delete from #should_delete_SK
```

After the temporary tables are cleaned up, control is passed to step 224.

The method then ends at step 224.

In accordance with an embodiment of the present invention, pending changes made within local database 108 by client application 104 are not treated as final (i.e., committed) until it is determined that the synchronization was successfully completed or EIS 114 indicates that the enterprise data system 116 has been updated to reflect the pending changes. One skilled in the relevant arts will recognize that modification to existing data may comprise the modification of one or more attributes of an MBO as represented within local database 108 on client 102.

In an embodiment, whenever a remote client initiates a modification to existing membership data, generally through the performance of an update or delete (i.e., eviction) function, the original state of the set membership data can be first preserved in an original state table, and the pending change added to a main table. Examples of various ways client application 104 may be configured to handle create, update, and delete requests through use of surrogate keys and tables is further detailed in U.S. patent application Ser. No. 12/813, 104, filed on Jun. 10, 2010 and entitled "Message Based Synchronization For Mobile Business Objects," which is incorporated by reference herein in its entirety.

Example Computer System Implementation

Figure 3:
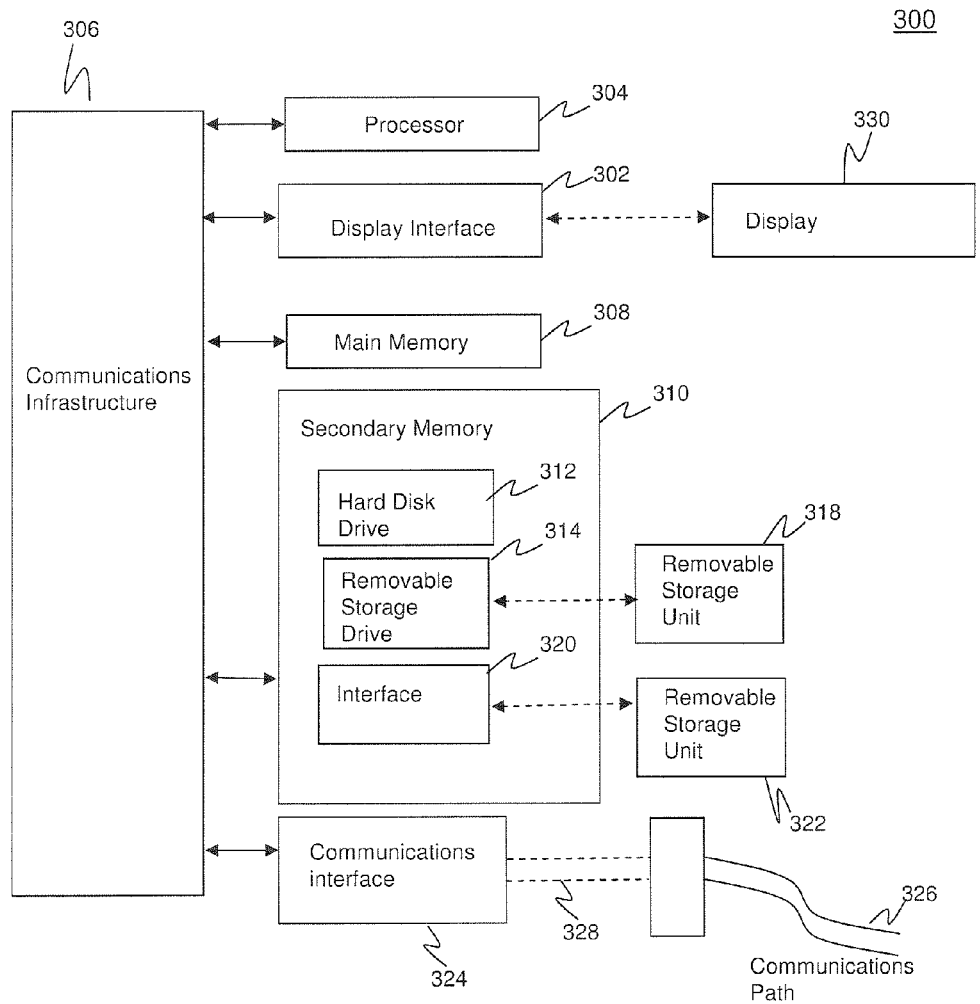
FIG. 3 depicts an example computer system in which embodiments of the present invention may be implemented.

Various aspects of the present invention can be implemented by software, firmware, hardware, or a combination thereof. FIG. 3 illustrates an example computer system 300 in which the present invention, or portions thereof, can be implemented as computer-readable code. For example, the method illustrated by the flowchart 200 of FIG. 2 can be implemented in system 300. Membership tracking and data eviction system 100 of FIG. 1 can also be implemented in system 300. Various embodiments of the invention are described in terms of this example computer system 300. After reading this description, it will become apparent to a person skilled in the relevant art how to implement the invention using other computer systems and/or computer architectures.

Computer system 300 includes one or more processors, such as processor 304. Processor 304 can be a special purpose or a general-purpose processor. Processor 304 is connected to a communication infrastructure 306 (for example, a bus, or network).

Computer system 300 also includes a main memory 308, preferably random access memory (RAM), and may also include a secondary memory 310. Secondary memory 310 may include, for example, a hard disk drive 312, a removable storage drive 314, flash memory, a memory stick, and/or any similar non-volatile storage mechanism. Removable storage drive 314 may comprise a floppy disk drive, a magnetic tape drive, an optical disk drive, a flash memory, or the like. The removable storage drive 314 reads from and/or writes to a removable storage unit 318 in a well-known manner. Removable storage unit 318 may comprise a floppy disk, magnetic tape, optical disk, etc. which is read by and written to by removable storage drive 314. As will be appreciated by persons skilled in the relevant art(s), removable storage unit 318 includes a non-transitory computer readable storage medium having stored therein computer software and/or data.

In alternative implementations, secondary memory 310 may include other similar means for allowing computer programs or other instructions to be loaded into computer system 300. Such means may include, for example, a removable storage unit 322 and an interface 320. Examples of such means may include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to computer system 300.

Computer system 300 may also include a communications interface 324. Communications interface 324 allows software and data to be transferred between computer system 300 and external devices. Communications interface 324 may include a modem, a network interface (such as an Ethernet card), a communications port, a PCMCIA slot and card, or the like. Software and data transferred via communications interface 324 are in the form of signals, which may be electronic, electromagnetic, optical, or other signals capable of being received by communications interface 324. These signals are provided to communications interface 324 via a communications path 326. Communications path 326 carries signals and may be implemented using wire or cable, fiber optics, a phone line, a cellular phone link, an RF link or other communications channels.

Computer system 300 may additionally include computer display 330. According to an embodiment, computer display 330, in conjunction with display interface 302, can be used to display the displays for EIS 114 and synchronization server 110 depicted in FIG. 1. Computer display 330 may also be used as an interactive interface (not shown) displayed via device I/O 106 on client 102.

In this document, the terms "computer program medium," "non-transitory computer readable medium," and "computer usable medium" are used to generally refer to media such as removable storage unit 318, removable storage unit 322, and a hard disk installed in hard disk drive 312. Signals carried over communications path 326 can also embody the logic described herein. Computer program medium and computer usable medium can also refer to memories, such as main memory 308 and secondary memory 310, which can be memory semiconductors (e.g. DRAMs, etc.). These computer program products are means for providing software to computer system 300.

Computer programs (also called computer control logic) are stored in main memory 308 and/or secondary memory 310. Computer programs may also be received via communications interface 324. Such computer programs, when executed, enable computer system 300 to implement the present invention as discussed herein. In particular, the computer programs, when executed, enable processor 304 to implement the processes of the present invention, such as the steps in the methods illustrated by flowchart 200 of FIG. 2 and system 100 of FIG. 1 discussed above. Accordingly, such computer programs represent controllers of the computer system 300. Where the invention is implemented using software, the software may be stored in a computer program product and loaded into computer system 300 using removable storage drive 314, interface 320, hard drive 312, or communications interface 324.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:
mapping native attributes for a mobile business object (MBO) to a relational structure;
building a list of unique surrogate keys that should currently be part of a subscription for a client, wherein the surrogate keys include values to be used by the client to account for an inability to access a key creation process, and wherein the list includes child mobile business objects (MBOs) referenced by parent MBOs that are expected to be on the client upon completion of a synchronization;
determining a set of deleted surrogate keys that the client currently has that are no longer in the list of unique surrogate keys that should currently be part of the subscription;
removing the deleted surrogate keys for the client from a client device database;
updating a surrogate key list the client is expected to have, wherein the updating comprises:
for surrogate keys the client already has, doing nothing; and
for each new surrogate key the client does not yet have:
inserting a row in the surrogate key list; and
setting a timestamp indicating when the new surrogate key first became part of what the client is expected to have.

2. The method of claim 1, wherein the building further comprises storing the list of unique surrogate keys in a temporary table, and wherein the method further comprises, after the updating: cleaning up the temporary table.

3. The method of claim 1, wherein the mapping is performed by middleware.

4. The method of claim 1, wherein the mapping is based upon the subscription for the client.

5. The method of claim 4, wherein the subscription for the client indicates interest in one or more members of a set.

6. The method of claim 5, wherein the subscription for the client indicates interest in members of a set related to a geographic region.

7. The method of claim 1, further comprising: repeating the determining step while additional surrogate keys need to be deleted.

8. The method of claim 1, wherein the building further comprises:
determining whether the client should have an MBO based on one or more of:
the client has an explicit pull query subscription on the MBO; or
the MBO is the child of a relationship of another MBO for which the client has a subscription.

9. The method of claim 1, further comprising: creating a download delete cursor for the client for the set of deleted surrogate keys.

10. The method of claim 2, wherein the set of deleted surrogate keys are stored in a second temporary table.

11. The method of claim 1, wherein the removing and the updating are part of database transactions that can be rolled back in response to determining that a subsequent data synchronization fails.

12. A non-transitory computer-readable medium having computer-executable instructions stored thereon that, in response to execution by a computing device, cause the computing device to perform a method comprising:
mapping native attributes for a mobile business object (MBO) to a relational structure;
building a list of unique surrogate keys that should currently be part of a subscription for a client, wherein the surrogate keys include values to be used by the client to account for an inability to access a key creation process, and wherein the list includes child mobile business objects (MBOs) referenced by parent MBOs that are expected to be on the client upon completion of a synchronization;
determining a set of deleted surrogate keys the client currently has that are no longer in the list of unique surrogate keys that should currently be part of the subscription;
removing the deleted surrogate keys for the client from a client device database;
updating a surrogate key list the client is expected to have, wherein the updating comprises:
for surrogate keys the client already has, doing nothing; and
for each new surrogate key the client does not yet have:
inserting a row in the surrogate key list; and
setting a timestamp indicating when the new surrogate key first became part of what the client is expected to have.

13. A system comprising:
a memory configured to store modules comprising:
a mapping module configured to map native attributes for a mobile business object (MBO) to a relational structure;
a building module configured to build a list of unique surrogate keys that should currently be part of a subscription for a client, wherein the surrogate keys include values to be used by the client to account for an inability to access a key creation process, and wherein the list includes child mobile business objects (MBOs) referenced by parent MBOs that are expected to be on the client upon completion of a synchronization;
a determining module configured to determine a set of deleted surrogate keys the client currently has that are no longer in the list of unique surrogate keys that should currently be part of the subscription;
an eviction module configured to remove the deleted surrogate keys for the client from a client device database;
an upsert module configured to update a surrogate key list the client is expected to have, wherein the upsert module is further configured to, for each new surrogate key the client does not yet have:
insert a row in the surrogate key list; and
set a timestamp indicating when the new surrogate key first became part of what the client is expected to have.

14. A method for synchronizing data updates between a mobile client device and an enterprise information system (EIS), the method comprising:
detecting an update to a subscription for a mobile client device or a change in set membership for a mobile business object (MBO);
building a surrogate key list of globally unique surrogate keys that should currently be part of the subscription, wherein the surrogate keys include values to be used by the mobile client device to account for an inability to access a key creation process, and wherein the surrogate key list includes child mobile business objects (MBOs) referenced by the MBO that are expected to be on the mobile client device upon completion of a synchronization;
filtering cached EIS data for a user associated with the mobile client device, wherein the filtering selects a subset of the cached EIS data to which the mobile client device is subscribed;

in response to detecting an eviction of a member from a set:
- sending a delete notification to the mobile client device to remove the evicted member; and
- updating a row in the surrogate key list corresponding to the evicted member to indicate that data associated with the surrogate key is not expected to be on the mobile client device; and in response to detecting a change to or addition of a member in a set:
- sending an upsert notification to the mobile client device to update the changed or added member;
- updating a row in the surrogate key list corresponding to the changed or added member to indicate that the data associated with the surrogate key is expected to be on the mobile client device; and
- setting a timestamp in the surrogate key list indicating when data associated with the surrogate key first became a part of the subscription data that the mobile client device is expected to have.

15. The method of claim 14, wherein the detecting further comprises: detecting a change in set membership for a parent of the MBO.

* * * * *